(12) United States Patent
Ishigaki (10) Patent No.: US 10,358,002 B2
(45) Date of Patent: Jul. 23, 2019

(54) PNEUMATIC TIRE

(71) Applicant: Sumitomo Rubber Industries, Ltd., Kobe-shi, Hyogo (JP)

(72) Inventor: Yuichi Ishigaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 238 days.

(21) Appl. No.: 15/390,136

(22) Filed: Dec. 23, 2016

(65) Prior Publication Data

US 2017/0197474 A1    Jul. 13, 2017

(30) Foreign Application Priority Data

Jan. 7, 2016   (JP) ................................ 2016-001919

(51) Int. Cl.
*B60C 13/02*    (2006.01)
*B60C 13/00*    (2006.01)

(52) U.S. Cl.
CPC ............ *B60C 13/002* (2013.01); *B60C 13/02* (2013.01); *B60C 2200/14* (2013.01)

(58) Field of Classification Search
None
See application file for complete search history.

(56) References Cited

U.S. PATENT DOCUMENTS

| | | | | | |
|---|---|---|---|---|---|
| 3,247,880 | A | * | 4/1966 | Batori | ..................... B60C 11/01 152/209.16 |
| 3,861,438 | A | * | 1/1975 | Bertelli | ..................... B60C 3/00 152/513 |
| 4,253,511 | A | * | 3/1981 | Curtiss, Jr. | ................ B60C 3/00 152/379.3 |
| D441,697 | S | * | 5/2001 | Allison | ......................... D12/536 |
| 6,920,906 | B2 | * | 7/2005 | Allison | ................... B60C 11/01 152/209.16 |
| 6,955,782 | B1 | * | 10/2005 | Ratliff, Jr. | .......... B29D 30/0629 264/326 |
| 2013/0306208 | A1 | * | 11/2013 | Kageyama | .............. B60C 13/02 152/209.16 |
| 2014/0261946 | A1 | * | 9/2014 | Chen | ....................... B60C 13/02 152/523 |
| 2016/0318561 | A1 | * | 11/2016 | Kodama | ................ B62D 25/16 |
| 2017/0210182 | A1 | * | 7/2017 | Mori | ........................ B60C 13/02 |
| 2018/0001707 | A1 | * | 1/2018 | Fujioka | .................... B60C 11/01 |
| 2018/0029424 | A1 | * | 2/2018 | Satake | ..................... B60C 11/01 |

FOREIGN PATENT DOCUMENTS

JP    2003-112505 A    4/2003
JP    2012-6449 A    1/2012

* cited by examiner

*Primary Examiner* — Jodi C Franklin
(74) *Attorney, Agent, or Firm* — Birch, Stewart, Kolasch & Birch, LLP

(57) ABSTRACT

A pneumatic tire has a side protector 9 comprising first protect ribs 11 and second protect ribs 12 arranged alternately in the circumferential direction. The first protect ribs 11 each have a main part 13 extending radially inwardly in the form of an S shape. The second protect ribs 12 each have a main part 14 extending radially inwardly in the form of an L shape.

11 Claims, 6 Drawing Sheets

PNEUMATIC TIRE

TECHNICAL FIELD

The present invention relates to a pneumatic tire having a sidewall portion provided with a side protector capable of improving mud performance and heat accumulation while ensuring cut resistant performance.

BACKGROUND ART

In the pneumatic tires used for cars running on rough roads such as 4WD-cars and trucks, the tire sidewall portion is usually provided on the outer surface thereof with a side protector protruding therefrom in order to prevent a cut damage caused by a sharp-edged stone and the like hitting the sidewall portion when running on a rough road.

Such a side protector is conventionally formed as a rib extending continuously in the tire circumferential direction, for example, as shown in FIG. 3 of Patent Literature 1 as listed below. The ribbed part is therefore increased in the rubber volume, and the heat accumulation therein is increased. As a result, the temperature is liable to increase, which is not preferable in view of the durability.

Patent Literature 2 as listed below discloses a pneumatic tire provided in the sidewall portion with a side protector, wherein the side protector is rib-shaped, and the outer surface thereof is provided with radially extending grooves. Such grooves decrease the rubber volume of the side protector and exert a heat dissipation effect. Therefore, the heat accumulation and heat buildup can be decreased. Further, when running on a rough road, the grooves can grip the mud to improve the mud performance of the tire.

Such rib-shaped side protector with the radial grooves is, however, still not satisfactory with respect to the mud performance and the heat accumulation, and there is room for improvement.

Patent Literature 1:
Japanese Patent Application Publication No. 2003-112505
Patent Literature 2:
Japanese Patent Application Publication No. 2012-6449

SUMMARY OF THE INVENTION

Problems to be Solved by the Invention

It is therefore, an object of the present invention to provide a pneumatic tire, in which the mud performance and the heat accumulation can be further improved, while ensuring the cut resistant performance.

According to the present invention, a pneumatic tire comprises:
a tread portion,
a pair of sidewall portions extending radially inwardly from both axial edges of the tread portion, and
a bead portion provided at a radially inner edge of each of the sidewall portions, wherein
an outer surface of at least one of the sidewall portions is provided with a side protector protruding therefrom and located in an upper sidewall area defined as being radially outside a maximum tire section width point, and
the side protector comprises first protect ribs and second protect ribs arranged alternately in the tire circumferential direction, the first protect ribs each have a main part extending radially inwardly from a radially outer edge of the side protector in the form of an S shape, and
the second protect ribs each have a main part extending radially inwardly from the radially outer edge of the side protector in the form of an L shape.

In the pneumatic tire according to the present invention, it is preferable that a radial length L1 of the main part of the first protect rib is different from a radial length L2 of the main part of the second protect rib.

In the pneumatic tire according to the present invention, it is preferable that the first protect rib has a sub part which is located adjacently to its main part on one side in the tire circumferential direction and is smaller in the height from the outer surface than its main part, and
the second protect rib has a sub part which is located adjacently to its main part on the above-mentioned one side in the tire circumferential direction and is smaller in the height from the outer surface than its main part.

In the pneumatic tire according to the present invention, it is preferable that
the main part of the first protect rib comprises
a first outer rib portion extending radially inwardly from a radially outer edge of the first protect rib,
a first middle rib portion extending in a bent manner from the first outer rib portion to the other side in the tire circumferential direction, and
a first inner rib portion extending radially inwardly in a bent manner from the first middle rib portion, and
the main part of the second protect rib comprises
a second outer rib portion extending radially inwardly from a radially outer edge of the second protect rib, and
a second inner rib portion extending in a bent manner from the second outer rib portion to the other side in the tire circumferential direction.

In the pneumatic tire according to the present invention, it is preferable that an angle θ1 of a side edge on the other side in the tire circumferential direction of the first middle rib portion with respect to a radial straight line thereon is in a range of from 100 to 140 degrees, and
an angle θ2 of a side edge on the other side in the tire circumferential direction of the second inner rib portion with respect to a radial straight line thereon is in a range of from 100 to 140 degrees.

According to the present invention, therefore, regarding the mud performance, as the first protect rib and the second protect rib have the S-shaped main part and the L-shaped main part, respectively, when running on a rough road, it is easy for the side protector to grip the mud on the road surface, but it is difficult to release the gripped mud. In other words, each of the protect ribs is improved in its grip performance.

Further, as the shapes of the main parts of the first and second protect ribs are different, the side surfaces in the tire circumferential direction of the protect ribs contact with or scratch the mud in different manners alternately. Thereby, the pneumatic tire is less likely to spin even on a slippery road surface, and the mud performance can be further improved.

Regarding the heat accumulation, the surface area of the side protector is increased due to the S-shaped and L-shaped concavity and convexity of the main parts of the first and second protect ribs, therefore, the heat dissipation effect is increased.

Further, the S-shaped and L-shaped concavity and convexity disturb the air flow along the sidewall portion during running, and it is changed from a laminar airflow to a disturbed flow. The disturbed flow furthers the heat dissipation. Thereby, it is possible to reduce the heat accumulation to suppress the temperature increase of the side protector.

Regarding the cut resistant performance, as the first and the second protect ribs form intricate concavity and convexity, it is possible to prevent a cut damage on the concave portions caused by a collision with a sharp-edged stone and the like, and it is possible to provide a necessary cut resistance.

BRIEF DESCRIPTION OF THE DRAWINGS

FIGS. 4(A1), 4(A2), 4(B1), 4(B2), 4(C1) and 4(C2) are schematic diagrams each illustrating another example of the shape of the first protect rib.

FIGS. 5(A1), 5(A2), 5(B1) and 5(B2) are schematic diagrams each illustrating another example of the shape of the second protect rib.

DESCRIPTION OF THE PREFERRED EMBODIMENTS

An embodiment of the present invention will now be described in detail in conjunction with accompanying drawings.

Figure 1:
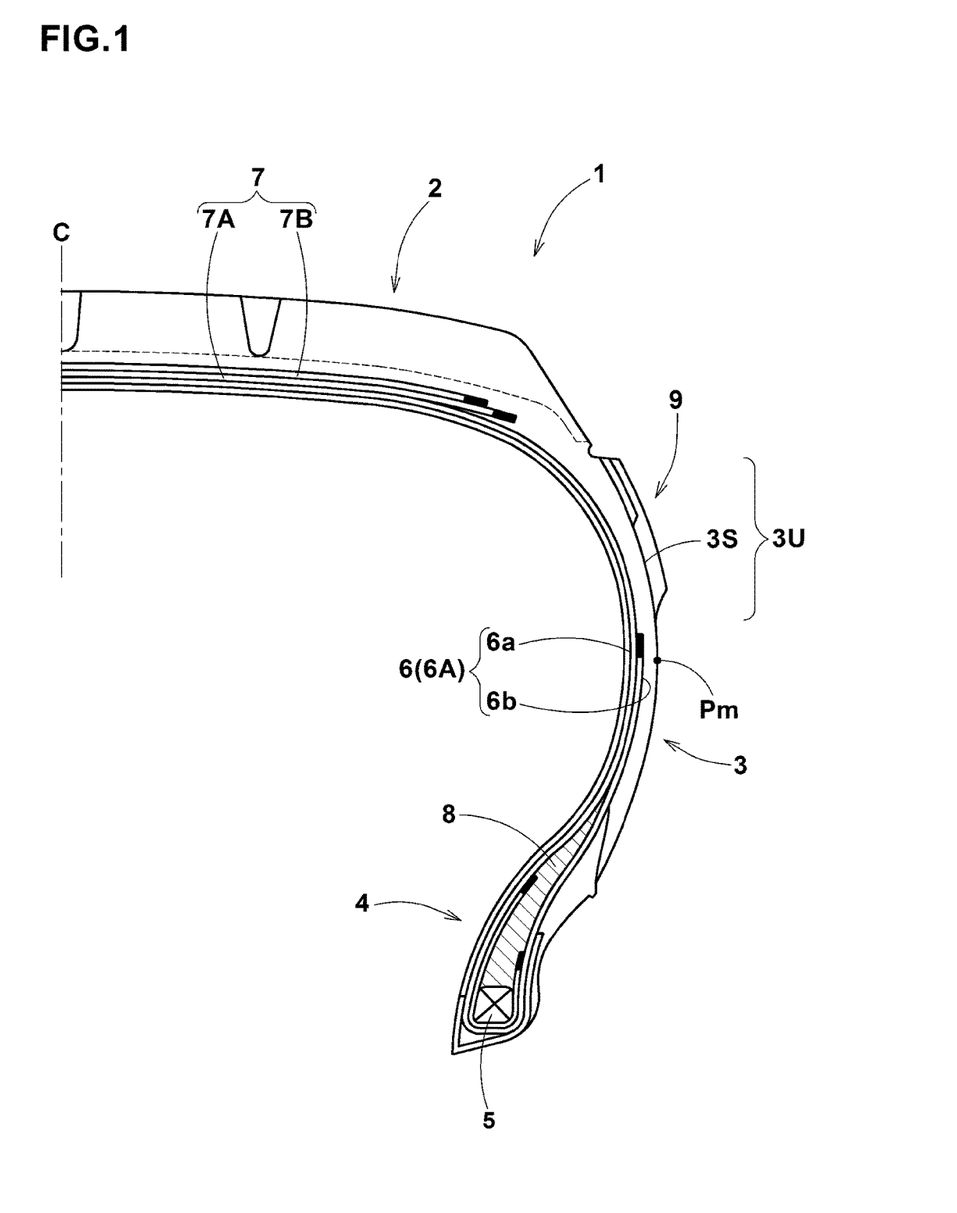
FIG. 1 is a cross-sectional view of a pneumatic tire as an embodiment of the present invention.

As shown in FIG. 1, a pneumatic tire 1 in the present embodiment comprises a tread portion 2 with tread edges, a pair of bead portions 4 each with a bead core 5 therein, and a pair of sidewall portions 3 extending between the tread edges and the bead portions 4.
The pneumatic tire is provided with reinforcing cord layers including a carcass 6 extending between the bead portions 4 through the tread portion 2 and the sidewall portions 3, and a belt 7 disposed radially outside the carcass 6 in the tread portion 2.

The carcass 6 comprises at least one (in this example, only one) ply 6A of cords arranged at an angle in a range from 70 to 90 degrees with respect to the tire circumferential direction, and extending between the bead portions 4 through the tread portion 2 and the sidewall portions 3, and further turned up around the bead core 5 in each of the bead portions 4 so as to form a pair of turned up portions 6b and a main portion 6a therebetween.
In this example, between the carcass ply main portion 6a and turned up portion 6b in each of the bead portions 4, a bead apex rubber 8 extending radially outwardly from the bead core 5 is disposed to reinforce the bead portion.

The belt 7 comprises at least one ply (in this example, two plies 7A and 7B) of parallel cords arranged at an angle in a range from 10 to 45 degrees with respect to the tire circumferential direction. The belt cords are arranged so as to intersect with those in an adjacent belt ply. Thereby, the belt rigidity is increased and the tread portion 2 is reinforced.

However, the carcass 6 and the belt 7 are not limited to these structures.

In the pneumatic tire 1 according to the present invention, at least one of (in this embodiment, each of) the sidewall portions 3 is provided with a side protector 9 protruding from the outer surface 3s thereof.

The side protector 9 is located in an upper sidewall area 3U defined as being radially outside a maximum tire section width point Pm. However, the side protector 9 may protrude radially inwardly from the maximum tire section width point Pm. Here, the "maximum tire section width point Pm" means the axially outermost position of the profile of the outer surface 3s of the sidewall portion 3.

Figure 2:
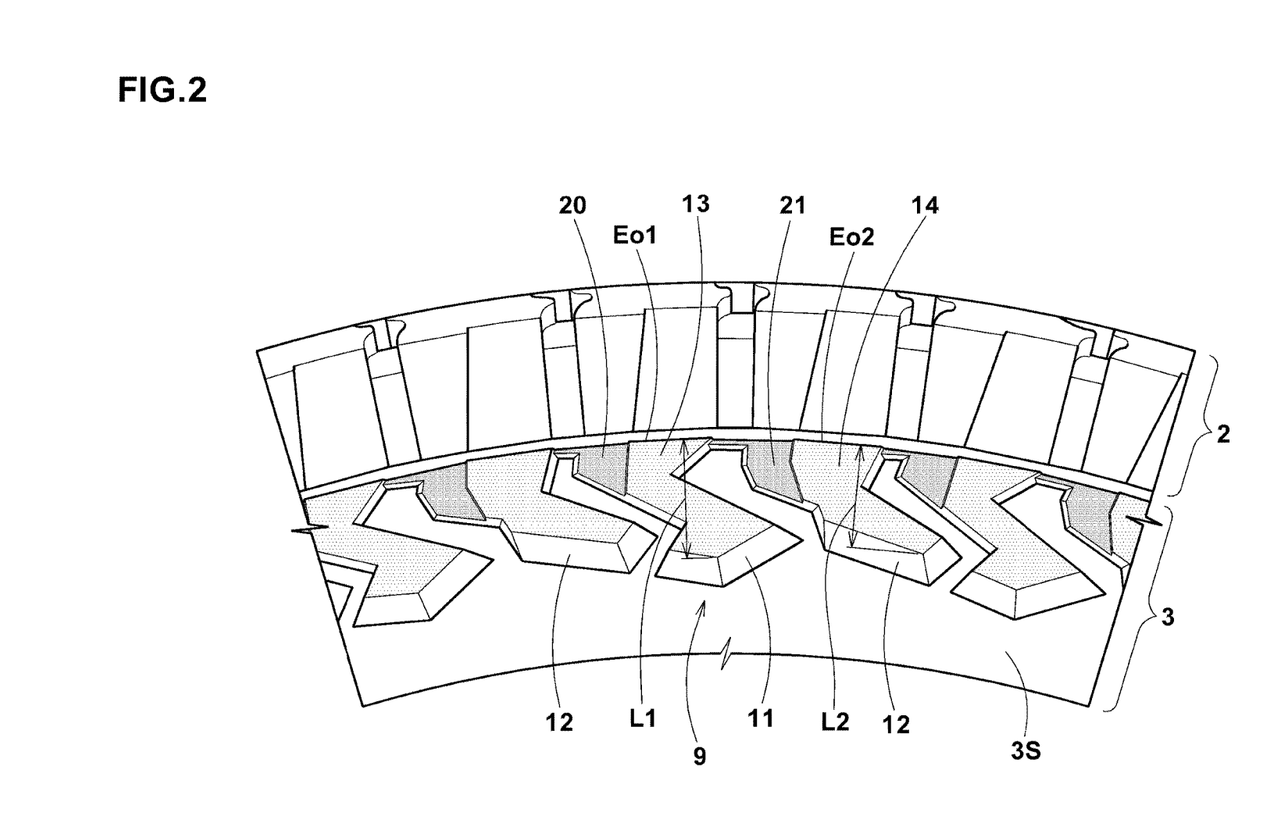
FIG. 2 is a partial side view of the pneumatic tire showing a side protector.

As shown in FIG. 2, the side protector 9 comprises first protect ribs 11 and second protect ribs 12 arranged alternately in the tire circumferential direction.

Figure 3:
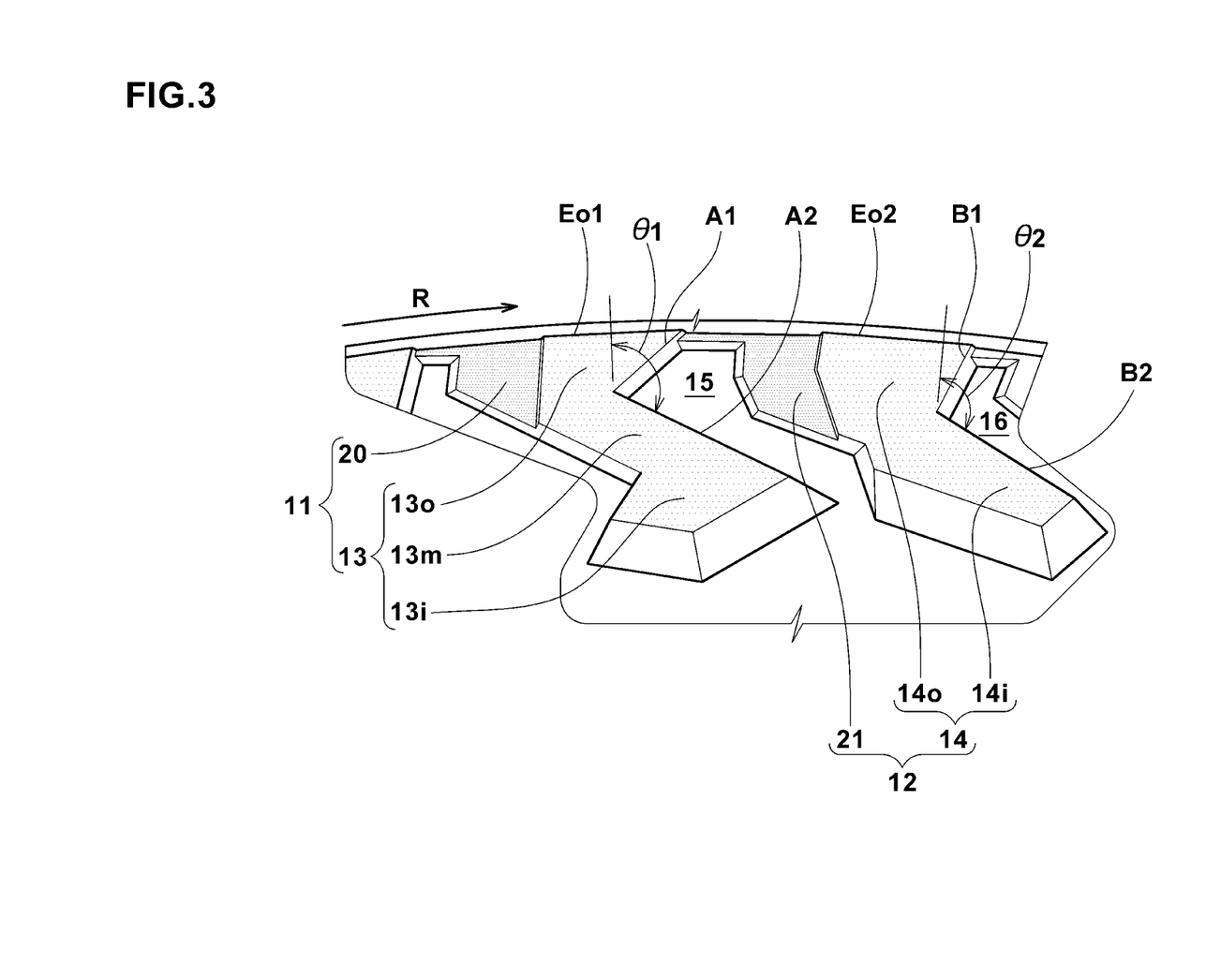
FIG. 3 is a closeup of FIG. 2 showing the first and second protect ribs of the side protector.

The first protect rib 11 has a main part 13 extending radially inwardly from its radially outer edge Eo1 in the form of an S shape. Note that the S shape includes a Z shape. As shown in FIG. 3, the main part 13 in this example comprises a first outer rib portion 13o, a first middle rib portion 13m, and a first inner rib portion 13i.

The first outer rib portion 13o extends radially inwardly from the outer edge Eo1.

Figure 4:
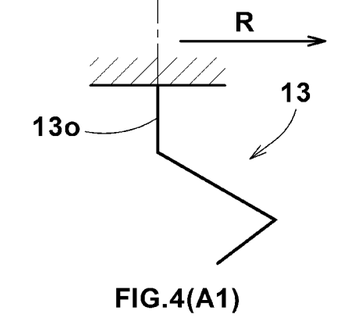

Preferably, the first outer rib portion 13o is inclined to one side in the tire circumferential direction toward the radially inside from the outer edge Eo1 as shown in FIG. 3. However, it may be possible to form the first outer rib portion 13o so as to be in parallel with the tire radial direction as shown in FIG. 4(A1), or so as to be inclined to the other side in the tire circumferential direction as shown in FIG. 4(A2).

The first middle rib portion 13m extends in a bent manner from the first outer rib portion 13o toward the other side in the tire circumferential direction.
Preferably, the first middle rib portion 13m is inclined to the other side in the tire circumferential direction toward the radially inside from the first outer rib portion 13o as shown in FIG. 3. However, it may be possible to configure the first middle rib portion 13m so as to extend radially outwardly from the first outer rib portion 13o while inclining to the other side in the tire circumferential direction as shown in FIG. 4(B1), or so as to extend from the first outer rib portion 13o toward the other side in the tire circumferential direction in parallel with the tire circumferential direction as shown in FIG. 4(B2).

The first inner rib portion 13i extends radially inwardly from the first middle rib portion 13m in a bent manner. Preferably, the first inner rib portion 13i is inclined to the above-mentioned one side in the tire circumferential direction toward the radially inside from the first middle rib portion 13m as shown in FIG. 3. However, it may be possible to configure the first inner rib portion 13i so as to be in parallel with the tire radial direction from the first middle rib portion 13m as shown in FIG. 4(C1), or so as to inclined to the other side in the tire circumferential direction as shown in FIG. 4(C2).

The first outer rib portion 13o, the first middle rib portion 13m, and the first inner rib portion 13i are each formed as having a linear shape in this embodiment.

In contrast, the second protect rib 12 has a main part 14 extending radially inwardly from its radially outer edge Eo2 in the form of an L shape as shown in FIG. 3.
The main part 14 in this embodiment comprises a second outer rib portion 14o and a second inner rib portion 14i.

The second outer rib portion 14o extends radially inwardly from the outer edge Eo2.

Figure 5:
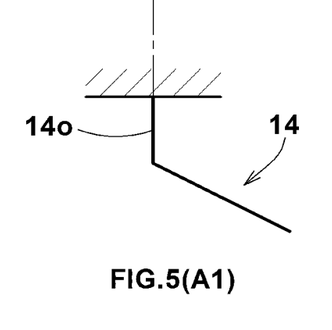

Preferably, the second outer rib portion 14o is inclined to the above-mentioned one side in the tire circumferential direction toward the radially inside from the outer edge Eo2. However, it may be possible to form the second outer rib portion 14o so as to be in parallel with the tire radial direction as shown in FIG. 5(A1), or so as to be inclined to the other side in the tire circumferential direction as shown in FIG. 5(A2).

The second inner rib portion 14*i* extends in a bent manner from the second outer rib portion 14*o* toward the other side in the tire circumferential direction.

Preferably, the second inner rib portion 14*i* is inclined to the other side in the tire circumferential direction toward the radially inside from the second outer rib portion 14*o*. However, it may be possible to configure the second inner rib portion 14*i* so as to extend from the second outer rib portion 14*o* toward the other side in the tire circumferential direction while inclining to the radially outside as shown in FIG. 5(B1), or so as to extend from the second outer rib portion 14*o* toward the other side in the tire circumferential direction in parallel with the tire circumferential direction as shown in FIG. 5(B2).

The second outer rib portion 14*o* and the second inner rib portion 14*i* are each formed as having a linear shape in this embodiment.

The pneumatic tire 1 in this embodiment is mounted on a vehicle so that the other side in the tire circumferential direction becomes equal to the heel-side in the intended tire rotational direction R. Therefore, as shown in FIG. 3, a V-shaped concave portion 15 of the first protect rib 11 is opened toward the intended tire rotational direction R, wherein the V-shaped concave portion 15 is formed between the side edge A1 on the other side in the tire circumferential direction of the first outer rib portion 13*o*, and the side edge A2 on the other side in the tire circumferential direction of the first middle rib portion 13*m*.

Further, as shown in FIG. 3, a V-shaped concave portion 16 of the second protect rib 12 is opened toward the intended tire rotational direction R, wherein the V-shaped concave portion 16 is formed between the side edge B1 on the other side in the tire circumferential direction of the second outer rib portion 14*o*, and the side edge B2 on the other side in the tire circumferential direction of the second inner rib portion 14*i*.

Therefore, when running on a rough road, the V-shaped concave portions 15 and 16 can easily grip the mud on the road surface therein, and it is difficult for the gripped mud to escape during contacting with the road surface. Thus, each of the main parts 13 and 14 of the first and second protect ribs 11 and 12 can improve the grip performance.

Further, as the shapes of the main parts 13 and 14 of the first and second protect ribs 11 and 12 are different from each other, the protect ribs 11 and 12 contact with or scratch the mud in different manners alternately. Thereby, the pneumatic tire is less likely to spin even on a slippery road surface, and it is possible to improve the mud performance in cooperation with the above-described improvement in the grip performance by the main parts.

Furthermore, in the side protector 9 in this embodiment, as shown in FIG. 2, a radial length L1 of the main part 13 differs from a radial length L2 of the main part 14.

Here, the lengths L1 and L2 are those of the main parts 13 and 14 measured at the respective outer surfaces thereof. Thereby, the contact (scratch) with the mud becomes further different between the first protect rib 11 and the second protect rib 12. Therefore, it is further less likely to spin, and it is possible to further improve the mud performance.

In this embodiment, the length L1 is set to be greater than the length L2.

Regarding the heat accumulation, the side protector 9 configured as such functions as follows.

That is, as the surface area is increased due to the concavity and convexity of the S-shaped and L-shaped main parts 13 and 14, the heat dissipation effect is improved.

Further, compared to the case where the concavity and convexity are made of only the S-shaped or L-shaped main parts, the concavity and convexity made of mixture of the S-shaped and L-shaped main parts disturb the air flow along the tire sidewall portion during running, and it is changed from a laminar airflow to a disturbed flow. The disturbed flow furthers the heat dissipation. Thereby, it is possible to reduce the heat accumulation to suppress the temperature increase of the side protector 9.

Regarding the cut resistant performance, as the main parts 13 and 14 form intricate concavity and convexity, it is less likely that a sharp-edged stone and the like hit the concave portion, and it is possible to prevent a cut damage and to provide a necessary cut resistance to ensure the required cut resistant performance.

In order to exert the above-described performance effectively, it is preferable that
the angle $\theta 1$ of the side edge A2 of the first protect rib 11 is in a range from 100 to 140 degrees with respect to a radial straight line thereon, and
the angle $\theta 2$ of the side edge B2 of the second protect rib 12 is in a range from 100 to 140 degrees with respect to a radial straight line thereon.

If the angles $\theta 1$ and $\theta 2$ are smaller than 100 degrees, it becomes difficult for the V-shaped concave portions 15 and 16 to grip the mud. If the angles $\theta 1$ and $\theta 2$ are greater than 140 degrees, it becomes easy for the gripped mud to escape. As a result, it causes deterioration of the grip performance, and consequently decrease of improvement effect on the mud performance.

Further, if the angles $\theta 1$ and $\theta 2$ are smaller than 100 degrees or greater than 140 degrees, the destabilizing influence on the air flow becomes small, and the heat dissipation effect is decreased.

It is preferable that the angles $\theta 1$ and $\theta 2$ are the same. However, they may be different from each other within the above-mentioned respective ranges depending on requirement.

Further, in this embodiment, the first protect rib 11 is provided with a sub part 20 located adjacently to the main part 13 of the first protect rib 11 on the above-mentioned one side in the tire circumferential direction.

The sub part 20 in this example is adjacent to only the first outer rib portion 13*o* as shown in FIG. 3.

Figure 6:
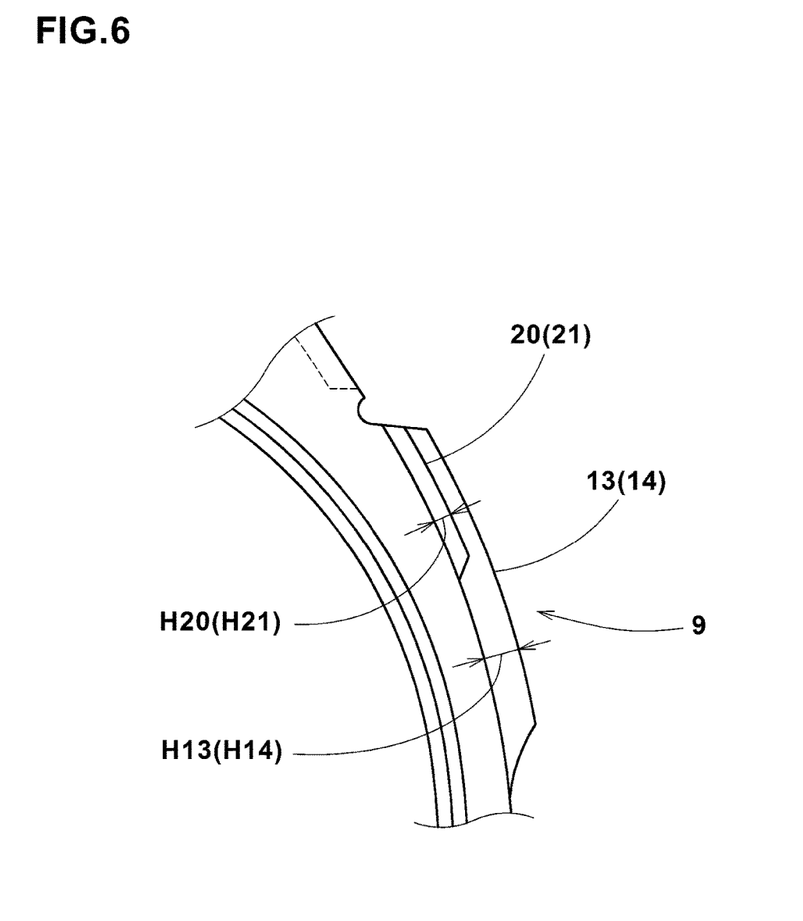
FIG. 6 is a cross-sectional view illustrating heights of a main part and a sub part of the first/second protect rib.

As shown in FIG. 6, a protruding height H20 of the sub part 20 from the outer surface 3*s* is smaller than a protruding height H13 of the main part 13 from the outer surface 3S. Specifically, the protruding height H20 is from 40% to 70%, preferably from 50% to 60% of the protruding height H13. From the point of view of cut resistant performance, the protruding height H13 is preferably not less than 4 mm, more preferably not less than 5 mm.

From the point of view of the heat accumulation, the protruding height H13 is preferably not greater than 7 mm, more preferably not greater than 6 mm.

Further, in this embodiment, the second protect rib 12 is provided with a sub part 21 located adjacently to the main part 14 the second protect rib 12 on the above-mentioned one side in the tire circumferential direction.

The sub part 21 in this example is adjacent to only the second outer rib portion 14*o*.

A protruding height H21 of the sub part 21 from the outer surface 3S is smaller than a protruding height H14 of the main part 13 from the outer surface 3S.

The protruding height H21 is set in a range from 40% to 70%, preferably 50% to 60% of the protruding height H14. From the point of view of the cut resistant performance, the protruding height H14 is not less than 4 mm, preferably not less than 5 mm. From the point of view of the heat accumulation, the protruding height H14 is not greater than 7 mm, preferably not greater than 6 mm.

In this embodiment, the height H14 is substantially the same as the height H13, and the height H21 is substantially the same as the height H20.

The sub parts 20 and 21 configured as such are preferable for improving the cut resistant performance while suppressing the deterioration in the mud performance and the heat accumulation.

It is preferable that the sub part 20 is formed so that the first protect rib 11 as a whole can keep its S shape.

Further, it is preferable that the sub part 21 is formed so that the second protect rib 12 as a whole can keep its L shape.

Further, in this embodiment, as shown in FIG. 2, each of the sub parts 20 of the first protect ribs 11 comprises a small rib part extending to the adjacent second protect rib 12, and each of the sub parts 21 of the second protect ribs 12 comprises a small rib part extending to the adjacent first protect rib 11. Accordingly, the protect ribs 11 and 12 are connected with each other via the thin rib parts of the sub parts 20 and 21, and as a result, the side protector 9 is continuous in the tire circumferential direction in its radially outer edge portion.

While detailed description has been made of an especially preferable embodiment of the present invention, the present invention can be embodied in various forms without being limited to the illustrated embodiment.

(1) Cut Resistant Performance:

The test tires were mounted on all of the wheels of a 4000 cc 4WD car with 17×7.5 rims and inner pressure of 220 kPa. Then the test car was driven on a rubble-strewn rough road for 1500 km, and cut damages (length×depth) caused in the sidewall portion were measured and totalized.

The results are indicated by an index based on the total value of Comparative example Ref.1 being 100, wherein the smaller the index value, the better the cut resistant performance.

(2) Mud Performance:

By using the test car, the traction during driving on a ground covered with about 200 mm depth of mud was evaluated based on the driver's feeling.

The results are indicated by an index based on Comparative example Ref.1 being 100, wherein the larger the index value, the better the mud performance.

(3) Heat Accumulation:

using a drum test machine, the inner temperature of the sidewall portion (at the position where the protect ribs were formed) was measured when driving on the drum at a speed of 100 km/h for 24 hours, with the test tires being mounted on 17×7.5 rims, inflated to a pressure of 220 kPa and loaded with a tire load of 5.8 kN.

The results are indicated as an index based on comparative example 1 being 100, wherein the smaller the index value, the lower the temperature and the better the durability.

(4) Tire Mass:

The mass of each of the test tires was measured and indicated as an index based on Comparative example Ref.1 being 100, wherein the smaller the index value, the smaller the tire mass and the lighter the tire.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- |
| First Protect Rib (S-shaped) | absence | presence | presence | presence | presence | presence | presence | presence | presence | presence |
| Height H13 of Main Part (mm) | — | 5 | 5 | 5 | 5 | 5 | 5 | 5 | 5 | 5 |
| Height H20 of Sub Part (mm) | — | 3 | 3 | 3 | 0 | 3 | 3 | 0 | 3 | 3 |
| Second Protect Rib (L-shaped) | absence | absence | presence | presence | presence | presence | presence | presence | presence | presence |
| Height H14 of Main Part (mm) | — | — | 5 | 5 | 5 | 5 | 5 | 5 | 5 | 5 |
| Height H21 of Sub Part (mm) | — | — | 3 | 3 | 0 | 3 | 3 | 0 | 3 | 3 |
| Angle θ1 (degree) | — | 120 | 120 | 120 | 120 | 80 | 120 | 120 | 100 | 140 |
| Angle θ2 (degree) | — | — | 120 | 120 | 120 | 120 | 80 | 80 | 100 | 140 |
| Length Ratio L1/L2 | — | — | 1 | 0.8 | 1 | 1 | 1 | 1 | 1 | 1 |
| Cut Resistant Performance | 100 | 65 | 65 | 60 | 75 | 65 | 65 | 75 | 65 | 60 |
| Mud Performance | 100 | 110 | 120 | 125 | 130 | 115 | 115 | 125 | 120 | 125 |
| Heat Storage Capacity | 100 | 120 | 110 | 112 | 105 | 110 | 110 | 105 | 115 | 115 |
| Tire Mass | 100 | 110 | 110 | 112 | 105 | 110 | 110 | 105 | 110 | 120 |

Working Examples

Pneumatic tires for 4WD cars having a tire size 265/70R17 and the internal tire structure shown in FIG. 1 were experimentally manufactured and tested for the cut resistant performance, mud performance and heat accumulation.

The test tires as working Examples Ex.1-Ex.8 were provided with side protectors having the specification listed in Table 1.

The test tire as Comparative example Ref.1 was provided with no side protector.

The test tire as Comparative example Ref.2 was provided with a side protector made up of the first protect ribs only.

Ex.1-Ex.8 and Ref.2 were the same with respect to the number of pitches of the protect ribs of each side protector.

The test tires having the first protect ribs were the same with respect to the length L1 of the first protect rib.

As shown in Table 1, it can be confirmed that the pneumatic tires as working examples were improved in the mud performance and the heat accumulation while ensuring the cut resistant performance.

REFERENCE SIGNS LIST 1 pneumatic tire
2 tread portion
3S outer surface
3U upper sidewall area
3 sidewall portion
4 bead portion
9 side protector
11 first protect rib
12 second protect rib
13*i* first inner rib portion
13*m* first middle rib portion 13o first outer rib portion
13 main part
14i second inner rib portion
14o second outer rib portion
14 main part
20 sub part
21 sub part
Pm maximum tire section width point

The invention claimed is:

1. A pneumatic tire comprising
a tread portion,
a pair of sidewall portions extending radially inwardly from both axial edges of the tread portion, and
a bead portion provided at a radially inner edge of each of the sidewall portions, wherein
an outer surface of at least one of the sidewall portions is provided with a side protector protruding therefrom and located in an upper sidewall area defined as being radially outside a maximum tire section width point, and
the side protector comprises first protect ribs and second protect ribs arranged alternately in the tire circumferential direction,
the first protect ribs each have a main part extending radially inwardly from a radially outer edge of the side protector in the form of an S shape, and
the second protect ribs each have a main part extending radially inwardly from the radially outer edge of the side protector in the form of an L shape, wherein the radially outer edge of the side protector is positioned at a constant radial position on said outer surface of the sidewall portion.

2. The pneumatic tire according to claim 1, wherein
the main parts of the first protect ribs have a radial length L1,
the main parts of the second protect ribs have a radial length L2, and
the radial length L1 is different from the radial length L2.

3. The pneumatic tire according to claim 1, wherein
in each of the first protect ribs, the first protect rib is provided with a sub part which is located adjacently to the main part of the first protect rib on one side in the tire circumferential direction and which is smaller in the height from said outer surface than the main part of the first protect rib, and
in each of the second protect ribs, the second protect rib is provided with a sub part which is located adjacently to the main part of the second protect rib on said one side in the tire circumferential direction and which is smaller in the height from said outer surface than the main part of the second protect rib.

4. The pneumatic tire according to claim 3, wherein in each of the first protect ribs, the main part of the first protect rib comprises
a first outer rib portion extending radially inwardly from a radially outer edge of the first protect rib,
a first middle rib portion extending in a bent manner from the first outer rib portion toward the other side in the tire circumferential direction, and
a first inner rib portion extending radially inwardly from the first middle rib portion in a bent manner, and
in each of the second protect ribs, the main part of the second protect rib comprises
a second outer rib portion extending radially inwardly from a radially outer edge of the second protect rib, and
a second inner rib portion extending in a bent manner from the second outer rib portion toward the other side in the tire circumferential direction.

5. The pneumatic tire according to claim 4, wherein
an angle θ1 of a side edge on the other side in the tire circumferential direction of the first middle rib portion with respect to a radial straight line thereon is in a range of from 100 to 140 degrees, and
an angle θ2 of a side edge on the other side in the tire circumferential direction of the second inner rib portion with respect to a radial straight line thereon is in a range of from 100 to 140 degrees.

6. The pneumatic tire according to claim 2, wherein in each of the first protect ribs, the main part of the first protect rib is made up of
a first outer rib portion extending radially inwardly from a radially outer edge of the first protect rib positioned at said constant radial position,
a first middle rib portion extending in a bent manner from the first outer rib portion toward one side in the tire circumferential direction, and
a first inner rib portion extending in a bent manner from the first middle rib portion toward the other side in the tire circumferential direction, and
in each of the second protect ribs, the main part of the second protect rib is made up of a second outer rib portion extending radially inwardly from a radially outer edge of the second protect rib positioned at said constant radial position, and
a second inner rib portion extending in a bent manner from the second outer rib portion toward said one side in the tire circumferential direction.

7. The pneumatic tire according to claim 6, wherein
in each of the first protect ribs, the first protect rib is provided with a sub part which is located adjacently to the main part of the first protect rib on said other side in the tire circumferential direction and which is smaller in the height from said outer surface than the main part of the first protect rib, and
in each of the second protect ribs, the second protect rib is provided with a sub part which is located adjacently to the main part of the second protect rib on said other side in the tire circumferential direction and which is smaller in the height from said outer surface than the main part of the second protect rib.

8. The pneumatic tire according to claim 7, wherein said sub part of each said first protect rib and said sub part of each said second protect rib extend radially inwardly from the radially outer edge of the side protector positioned at said constant radial position.

9. The pneumatic tire according to claim 8, wherein
said sub part of each said first protect rib has a narrow portion extending toward said other side in the tire circumferential direction to the adjacent second protect rib along the radially outer edge of the side protector, and
said sub part of each said second protect rib has a narrow portion extending toward said other side in the tire circumferential direction to the adjacent first protect rib along the radially outer edge of the side protector.

10. The pneumatic tire according to claim 3, wherein said sub part of each said first protect rib and said sub part of each said second protect rib extend radially inwardly from the radially outer edge of the side protector positioned at said constant radial position.

11. The pneumatic tire according to claim 9, wherein
said sub part of each said first protect rib has a narrow portion extending toward said one side in the tire circumferential direction to the adjacent second protect rib along the radially outer edge of the side protector, and
said sub part of each said second protect rib has a narrow portion extending toward said one side in the tire circumferential direction to the adjacent first protect rib along the radially outer edge of the side protector.

* * * * *